Patented Jan. 4, 1949

2,458,355

UNITED STATES PATENT OFFICE 2,458,355

COPOLYMERS OF 2-ACYLAMINO-1,3-BUTA-DIENES AND VINYL COMPOUNDS

Joseph B. Dickey, Rochester, N. Y., assignor to Eastman Kodak Company, Rochester, N. Y., a corporation of New Jersey No Drawing. Application December 22, 1945, Serial No. 637,097

11 Claims. (Cl. 260—86)

The present invention relates to copolymers of acylamino butadienes and monomeric ethylenic unsaturated compounds and to methods of their preparation. More particularly, it relates to copolymers of 2-acylamino-1,3-butadienes with a polymerizable monomeric ethylenic unsaturated compound.

The copolymerization of butadienes with monomeric vinyl compounds is known. Such products are characterized by having oil-like and rubber-like properties which tend to restrict their direct use for making materials requiring strength to retain form, such as fibers, threads, filaments and films. I have now found that by copolymerizing the acyl derivatives of 2-aminobutadiene-1,3 with polymerizable monomeric ethylenic unsaturated compounds, the copolymers thus obtained have higher softening temperatures than the corresponding copolymers of butadiene or 2-aminobutadiene-1,3, and yield from their solutions and compositions threads, filaments, fibers and films which have good flexibility and strength.

This invention has as its object, therefore, the preparation of new and useful copolymers of 2-acylamino-1,3-butadienes and polymerizable monomeric ethylenic unsaturated compounds. A further object is to provide a process for preparing the same. Other objects will become apparent hereinafter.

In the preparation of the compounds of the invention, an acylaminobutadiene having the general formula:

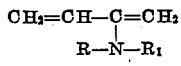

wherein R represents a member selected from the group consisting of hydrogen, an alkyl group, an aryl group of the benzene series, and an acyl group; and $R_1$ represents an acyl group, is copolymerized with one or more ethylenically unsaturated derivatives in any practical proportions, for example, from about one to 99 parts of the diene to about 99 to one parts of the ethylenic unsaturated compounds. A polymerization catalyst, for example, boron trifluoride, aluminum chloride, peroxides such as benzoyl, acetyl, urea, tetralin, ether and hydrogen peroxides, sodium alkyls or aryls, oxygen and light, can be employed to facilitate the polymerization reaction. The polymerizations may be carried out under normal pressures, but pressures up to 5000–7000 atmospheres can also be employed. Such polymerizations may be made in mass, in emulsion conditions or in beads. More specifically, the polymerizable ethylenically unsaturated organic compounds are intended to include, for example, ethylene, isobutylene, butadiene, styrene, methyl acrylate, amides of acrylic acids, esters, ester amides and nitriles of fumaric and maleic acids, maleic imide, acrylonitrile, vinyl esters such as vinyl acetate, vinyl butyrate, isopropenyl acetate, vinyl halides, vinyl ketones, vinyl ethers, vinyl sulfones and sulfonamides, vinyl ureas and urethanes, vinylidine dihalides, and other similar kinds of unsaturated compounds. The intermediate 2-amino-1,3-butadienes or N-monosubstituted 2-amino-1,3-butadienes, from which the acyl derivatives are obtained by well-known methods of acylating amino groups, can be prepared by the general procedure described in U. S. Patent 2,301,971, issued November 17, 1942, to Walter Reppe and Otto Hecht. The intermediate monomeric acyl derivatives employed in my invention are described in my copending application, Serial Number 637,098, filed of even date herewith, now U. S. Patent 2,446,172.

The following examples will serve to illustrate my new compounds and the manner of obtaining the same:

*Example I.—Copolymers of 2-acetylamino-butadiene-1,3 and vinyl acetate*

A. Eleven grams of 2-acetylaminobutadiene-1,3, 86 grams of vinyl acetate and 0.2 gram of benzoyl peroxide were polymerized in a closed vessel at 40° C. for several days, then slowly heated to 60° C., and polymerization continued at that temperature until the reaction was complete. The hard and tough product obtained was removed from the reaction vessel and purified by dissolving in pyridine and reprecipitating in water. Coatings made from this product were flexible and of sufficient strength to retain their shape as films, threads and molded objects, under conditions of normal usage.

In place of the 2-acetylaminobutadiene-1,3, there can be substituted an equivalent amount of 2-propionylaminobutadiene-1,3, 2-benzoylaminobutadiene-1,3 or N-phenyl-2-carbamidobutadiene-1,3, to obtain similar kinds of products.

B. One hundred eleven grams of 2-acetylaminobutadiene-1,3, 8.6 grams of vinyl acetate and 0.2 gram of benzoyl peroxide were polymerized together as described in above A. Coatings made from the copolymer were somewhat softer than the preceding example, but were also suitable for making fibrous and sheet materials.

*Example II.—Copolymer of N-phenyl-2-malonamidobutadiene-1,3 and methyl acrylate*

Twenty-three grams of N-phenyl-2-malonamidobutadiene-1,3, 50 grams of methyl acrylate and 0.1 gram of benzoyl peroxide were mixed together, polymerized and purified as described in above Example I. The product obtained was tough and elastic. Similar kind of products were likewise obtained, when the polymerizations were carried out in formic acid, acetic acid or in formamide. In place of the butadiene derivative in this example, there can be substituted 1-methyl-N-methyl-2-phenylcarbamic ester-1,3-butadiene or 1-cyano-2-sulfamylacetaminobutadiene-1,3, the products obtained being tough and elastic.

*Example III.—Copolymers of 2-ethyluramidobutadiene-1,3 and vinyl chloride*

A. Fourteen grams of 2-ethyluramidobutadiene-1,3, 62 grams of vinyl chloride and 0.2 gram of benzoyl peroxide were dissolved in acetic acid and polymerized at 50° C., for a period of three days. The gel that resulted was dissolved by addition of more acetic acid, and the dope then precipitated into water. The precipitate was a white solid which could be spun into filaments, cast into films or molded into objects from its compositions. The ratio of the monomers may be varied between fairly wide limits, as desired. With variations, the products would simply contain the separate radicals in the copolymers in about the same ratio as the monomers in the starting reaction mixtures. In place of 2-ethyluramidobutadiene-1,3, there can be substituted in the above example 2-acetylhydrazo butadieene-1,3 or 1-acetoxy-N-phenyl-2-butyrylamino butadiene-1,3 and obtain thereby similar type of moldable resins.

B. One hundred forty grams of 2-ethyluramido butadiene-1,3, 6.2 grams of vinyl chloride and 0.2 gram of benzoyl peroxide were dissolved in acetic acid and polymerized following the procedure of preceding A. The copolymer obtained was similar to that of A, except that the softening temperature was somewhat lower.

*Example IV.—Copolymer of N-p-anisyl-2-methoxyacetylamino butadiene-3,1 and styrene*

Twenty-five grams of N-p-anisyl-2-methoxyacetylamino butadiene-1,3, 80 grams of styrene and 0.2 gram of tetralin peroxide were heated at 50° C., until polymerization was complete. The product purified by the method described in Example I proved readily moldable and gave good filaments, threads and films from its plastic flowble compositions. The reaction mixtures of the monomers can be varied within fairly wide limits to produce thereby copolymers having the radicals of the monomers present in about the same ratio.

*Example V.—Copolymer of 2-acetylaminobutadiene-1,3 and ethylene*

Ten grams of 2-acetylaminobutadiene-1,3 were placed in a 150 cc. capacity super pressure autoclave, and ethylene pumped in under a pressure of 1000 atmospheres. Heat at 180° C. was applied for a period of 20 hours. The product obtained was a clear, tough solid.

*Example VI.—Copolymer of 2-propionylaminobutadiene-1,3 and styrene*

Five grams of 2-propionylaminobutadiene-1,3 and 5 grams of styrene were placed in a super pressure autoclave. Ethylene was then pumped into the autoclave under a pressue of 1500 atmospheres, and the whole heated at 190° C. for 24 hours. The reaction product was a slightly yellowish, clear, tough resin suitable for molding, and making filaments, threads, fibers and films.

*Example VII.—Copolymer of 2-butyrylaminobutadiene-1,3 and vinyl chloride*

Five grams of 2-butyrylaminobutadiene-1,3 and 3 grams of vinyl chloride were placed in a super pressure autoclave. Ethylene was pumped into the autoclave under a pressure of 1000 atmospheres, and the mixture heated at 210° C. for a period of 18 hours. The reaction product was a yellowish colored, tough solid suitable for the production of fibrous materials and sheets.

*Example VIII.—Copolymer of 2-tetrahydrofuroylaminobutadiene-1,3 and vinyl compounds*

Five grams of 2-tetrahydrofuroylaminobutadiene-1,3, 2 grams of vinyl chloride and 2 grams of vinylidene chloride fluoride were charged into a super pressure autoclave, and ethylene pumped in, until a pressure of 1500 atmospheres was reached. The mixture was then heated at 180° C. for a period of 24 hours. The product was a slightly yellowish colored, tough solid suitable for preparing filaments, films, molding, and the like.

*Example IX.—Copolymer of N-p (or ortho)-butylphenyl-2-butyrylaminobutadiene-1,3, diisopropyl fumarate and isopropenyl acetate*

Three grams of N-butylphenyl-2-butyrylaminobutadiene-1,3, 100 grams of di-iso-propyl fumarate, 50 grams of isopropenyl acetate, 0.3 gram of benzoyl peroxide, 500 cc. of water and 1.25 grams of gum arabic were placed in a bottle of a size allowing for approximately 10 per cent free air space, and tumbled at about 50 R. P. M. at a temperature of about 50° C. When the polymerization was complete, the polymer in the form of beads was removed, washed with water and dried at 50° C. The resulting colorless and tough resin was suitable for molding.

*Example X.—Copolymer of N-ethyl-2-acetylaminobutadiene-1,3, methyl-iso-propenyl ketone and styrene*

Ten grams of N-ethyl-2-acetylaminobutadiene, 40 grams of methyl-iso-propenyl ketone and 55 grams of styrene were polymerized in the manner described in Example IX. The product was a hard, tough, elastic polymer suitable for molding and making films and threads therefrom. In place of styrene in this example, there can be substituted, for example, vinyl naphthalene, p-chlorostyrene, α-methyl styrene, α-acetoxy styrene, and in place of methylisopropenyl ketone, there can be substituted, for example, methyl vinyl ketone, methyl-α-fluoro vinyl ketone, benzalacetone, 2-acetyl methyl vinyl ketone, and similar kinds of unsaturated monomeric vinyl compounds.

*Example XI.—Copolymer of N-butyl-2-acetylaminobutadiene-1,3, acrylonitrile and styrene.*

A. Twenty grams of N-butyl-2-acetylaminobutadiene-1,3, 25 grams of acrylonitrile and 55 grams of styrene were polymerized in the manner described in Example IX. The product was suitable for molding and making filaments, fibers, threads and films.

B. One hundred grams of N-butyl-2-acetylaminobutadiene-1,3, 5 grams of acrylonitrile and 11 grams of styrene were polymerized in the manner described in Example IX. The product had a lower softening temperature than that of preceding A, but could be readily molded and fashioned into threads and sheet materials.

*Example XII.—Copolymer of N-lauryl-2-acetylaminobutadiene-1,3, acrylonitrile and methyl methacrylate*

Twenty-five grams of N-lauryl-2-acetylaminobutadiene-1,3, 25 grams of acrylonitrile and 100 grams of methyl methacrylate were polymerized in the same manner as process described in Example IX. The product was suitable for the production of filaments, threads and films.

*Example XIII.—Copolymer of N-ethyl-2-acetylaminobutadiene-1,3 and styrene*

Four grams of N-ethyl-2-acetylaminobutadiene-1,3, 31 grams of styrene, 0.5 gram urea peroxide, 55 cc. of water, 0.9 gram of gelatin, 0.05 gram of 2-ethylhexanol, 0.18 gram of a sodium alkyl naphthalene sulfonate and 0.067 gram of carbon tetrachloride were emulsified and shaken for 3–4 days at 50–60° C. The resulting copolymer was precipitated by adding hydrochloric acid in slight excess, preceded by a small amount of phenyl naphthylamine. The polymer was vulcanizable.

*Example XIV.—Copolymer of N-methyl-2-acetylaminobutadiene-1,3 and butadiene-1,3*

Four grams of N-methyl-2-acetylaminobutadiene-1,3, 16.2 grams of butadiene-1,3, 0.5 gram of urea peroxide, 0.9 gram of gelatin, 0.05 gram of 2-ethylhexanol, 0.067 gram of carbon tetrachloride and 0.18 gram of a sodium alkyl naphthalene sulfonate were emulsified and held at a temperature of 55° C. for 4 days with stirring. Then a small amount of phenyl-α-naphthylamine was added, and the polymer precipitated by adding a small excess of acetic acid. Dilute mineral acids, such as hydrochloric or sulfuric acids can be used in place of the acetic acid. The polymer obtained was tough, elastic and vulcanizable.

*Example XV.—Copolymer of 2-diacetylaminobutadiene-1,3, butadiene-1,3 and isobutylene*

Two grams of 2-diacetylaminobutadiene-1,3, 54 grams of butadiene-1,3 and 5 grams of isobutylene were mixed together and cooled to at least —50° C. Boron trifluoride was then passed into the mixture. The polymerized product was obtained as a solid, which was tough, elastic, vulcanizable and with softening point substantially higher than a similar polymer in which the amino grouping was absent.

*Example XVI.—Copolymer of N-β-acetoxyethyl-2-acetylaminobutadiene-1,3, vinyl acetate and vinyl chloride*

Five grams of N-β-acetoxyethyl-2-acetylaminobutadiene-1,3, 9 grams of vinyl acetate and 62 grams of vinyl chloride were mixed and polymerized at 50° C., using benzoyl peroxide as a catalyst. The product was a light yellow in color, tough solid suitable for the production of filaments, threads, films and molded objects.

*Example XVII.—Copolymer of N-β-methoxyethyl-2-acetylaminobutadiene-1,3, isopropenyl acetate, vinyl chloride and fumaronitrile*

Twenty grams of N-β-methoxyethyl-2-acetylaminobutadiene-1,3, 10 grams of isopropenyl acetate, 60 grams of vinyl chloride and 5 grams of fumaronitrile were polymerized with benzoyl peroxide as a catalyst. The product obtained was a solid which was suitable for molding and drawing into threads, filaments, and casting into sheet materials.

The copolymers of the above examples and products closely related thereto can be extruded in the form of wires, rods, tubes and sheets, or molded by the usual compression or injection processes. Fillers, coloring materials and plasticizers can be added. In the usual practice, the polymer is first softened, fillers added, if desired, and then kneaded, rolled, vulcanized, compressed or drawn under normal or heated conditions. The copolymers of the invention can also be transformed into useful films and sheets by making a solution of the polymer in a solvent, and then casting the solution on a film-forming surface such as a glass or metal plate or smooth revolving drum, allowing the cast film to dry, and stripping the film from the surface. Solutions of the copolymers can also be extruded in the form of fine thread into a drying atmosphere or a precipitating bath.

What I claim is:

1. A copolymer derived by polymerization of a mixture including from about 1 to 99 molecular parts of a conjugated diene of the general formula:

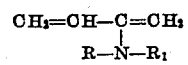

wherein R represents a member selected from the group consisting of hydrogen, an alkyl group, an aryl group of the benzene series, and the acyl radical of a carboxylic acid; and $R_1$ represents the acyl group of a carboxylic acid, each of said radicals having not more than 12 carbon atoms in the chain, and from about 99 to 1 molecular parts of a polymerizable monomeric ethylenically unsaturated organic compound.

2. A copolymer derived by polymerization of a mixture including from about 1 to 99 molecular parts of a conjugated diene of the general formula:

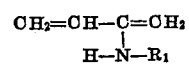

wherein $R_1$ represents the acyl radical of a carboxylic acid, the said radical having not more than 12 carbon atoms in the chain, and from about 99 to 1 molecular parts of a polymerizable monomeric ethylenically unsaturated organic compound.

3. A copolymer derived by polymerization of a mixture including from about 1 to 99 molecular parts of a conjugated diene of the general formula:

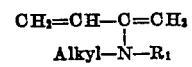

wherein $R_1$ represents the acyl radical of a carboxylic acid, the said radical having not more than 12 carbon atoms in the chain, and from about 99 to 1 molecular parts of a polymerizable monomeric ethylenically unsaturated organic compound.

4. A copolymer derived by polymerization of a mixture including from about 1 to 99 molecular parts of a conjugated diene of the general formula:

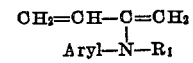

wherein $R_1$ represents the acyl radical of a carboxylic acid, the said radical having not more than 12 carbon atoms in the chain, and from about 99 to 1 molecular parts of a polymerizable monomeric ethylenically unsaturated organic compound.

5. A copolymer derived by polymerization of a mixture including from 1 to 99 molecular parts of 2-acetylamino-butadiene-1,3, to from 99 to 1 molecular parts of vinyl acetate.

6. A process which comprises heating a mixture including a conjugated diene of the general formula:

$$CH_2=CH-C(R-N-R_1)=CH_2$$

wherein R represents a member selected from the group consisting of hydrogen, an alkyl group, an aryl group of the benzene series, and the acyl radical of a carboxylic acid; and $R_1$ represents the acyl radical of a carboxylic acid, each of said radicals having not more than 12 carbon atoms in the chain, and a polymerizable monomeric ethylenically unsaturated organic compound.

7. A process which comprises heating a mixture including a conjugated diene of the general formula:

$$CH_2=CH-C(H-N-R_1)=CH_2$$

wherein $R_1$ represents an acyl radical of a carboxylic acid, the said radical having not more than 12 carbon atoms in the chain, and a polymerizable monomeric ethylenically unsaturated organic compound.

8. A process which comprises heating a mixture including a conjugated diene of the general formula:

$$CH_2=CH-C(Alkyl-N-R_1)=CH_2$$

wherein $R_1$ represents an acyl radical of a carboxylic acid, the said radical having not more than 12 carbon atoms in the chain, and a polymerizable monomeric ethylenically unsaturated organic compound.

9. A process which comprises heating a mixture including a conjugated diene of the general formula:

$$CH_2=CH-C(Aryl-N-R_1)=CH_2$$

wherein $R_1$ represents the acyl radical of a carboxylic acid, the said radical having not more than 12 carbon atoms in the chain, and a polymerizable monomeric ethylenically unsaturated organic compound.

10. A copolymer derived by polymerization of a mixture including from 1 to 99 molecular parts of N-lauryl-2-acetylamino-butadiene-1,3, to from 99 to 1 molecular parts of acrylonitrile.

11. A copolymer derived by polymerization of a mixture including from 1 to 99 molecular parts of N-p-anisyl-2-methoxy-acetylamino butadiene-1,3, to from 99 to 1 molecular parts of styrene.

JOSEPH B. DICKEY.

REFERENCES CITED

The following references are of record in the file of this patent:

UNITED STATES PATENTS

| Number | Name | Date |
|---|---|---|
| 2,301,971 | Reppe et al. | Nov. 17, 1942 |